United States Patent [19]

Foster

[11] Patent Number: 5,194,293
[45] Date of Patent: Mar. 16, 1993

[54] PROCESS FOR FINISHING A PLASTIC SURFACE

[76] Inventor: Brian C. Foster, 2973 Corte Portofino, Newport Beach, Calif. 92660

[21] Appl. No.: 801,054

[22] Filed: Dec. 3, 1991

[51] Int. Cl.$^5$ .............................................. B05D 3/06
[52] U.S. Cl. .................................. 427/512; 427/140; 427/322; 427/331; 427/412.1; 427/421; 427/508
[58] Field of Search ...................... 427/54.1, 322, 331, 427/412.1, 421, 140

[56] References Cited

U.S. PATENT DOCUMENTS 4,301,193  11/1981  Zuk ..................................... 427/140

Primary Examiner—Bernard Pianalto
Attorney, Agent, or Firm—Plante, Strauss & Vanderburgh

[57] ABSTRACT

A method is disclosed for restoring weathered plastic surfaces and for enhancing the resistance of the treated surface to sunlight. The surface of a plastic article being treated is first cleaned with a suitable cleaning agent and the surface is polished with a mild abrasive to remove major imperfections in the surface. Following cleaning and polishing, a first layer of an uncured adhesive material is applied over the surface. The adhesive material is selected from those compositions that are ultraviolet curable. An outer coat of a curable adhesive is applied over the uncured to form a semi-permanent outer surface on the article. The article then can be exposed to sunlight and other effects of weathering and over a period of time the underyling ultraviolet curable coating is gradually cured by exposure to sunlight so that the composite coating on the surface of the article becomes even tougher and better cured the more the article is exposed to sunlight.

7 Claims, No Drawings

PROCESS FOR FINISHING A PLASTIC SURFACE

FIELD OF THE INVENTION

This invention relates to a method for treating a plastic surface and to products having an improved weather resistant surface.

BACKGROUND OF THE INVENTION

A number of products formed of polymeric material, generically referred to as plastic, are utilized out of doors where they are exposed to various weather conditions, particularly to sunlight. The ultraviolet radiation in sunlight has a deleterious effect on the surfaces of such products causing them to become discolored and crazed to the point where the surface is unattractive. In the case of certain products, particularly transparent products used as aircraft and vehicular windows and windshields, exposure to sunlight and other weather conditions can cause a substantial loss in transparency requiring replacement of the window or windshield. Various methods have been available in the prior art for refinishing "plastic" surfaces that have become weathered. Basically these methods include the use of combinations of various solvents which remove scratches and weathered surface material and restore the surface of the article.

For example, U.S. Pat. No. 4,322,861, Franz et al, discloses a method for improving and restoring the surface of plastic transparencies by coating the surface with a clear high gloss polymer, preferably made of a fast curing acrylic, polyurethane or epoxy resin.

U.S. Pat. No. 4,133,912, Stuart, similarly discloses a method for refinishing thermoplastics by cooling the body of the article to be refinished, spraying the surface with a solvent which dissolves and reforms the immediate surface of the body but does not attack the underlying material.

U.S. Pat. No. 4,301,193, Zuk, relates to a process for restoring clear plastic articles which involves a polishing formulation containing a mild abrasive to the surface to be treated and polishing the surface to remove scratches and dirt therefrom. Following the polishing operation a coating of liquid silicone is applied on the surface and wiped off to remove residual dirt and leave behind a thin layer of the silicone which fills the microscopic imperfections in the surface caused by the polishing.

U.S. Pat. No. 4,374,745, Sibley, relates to a cleaning composition for glass and plastic, particularly optical glasses and plastics which is a gel which includes a preservative and a cleaner and may further include an anti-fogging agent.

While the foregoing methods may be suitable for restoring the transparency and surface condition of a plastic article, it is clear that these prior art compositions and methods do little to improve the resistance to weathering of the treated surface of the article and thus while the surface may be temporarily restored, the weathering effect will become more and more pronounced over a period of time and will eventually require replacement of the article.

Accordingly, it would be highly desirable to have a method for enhancing the weatherability of plastic articles, such as signs, windows, outdoor furniture and the like, which both enhances and restores the surface of the product and also makes the surface more resistant to the effects of sunlight, particularly ultraviolet radiation which has a deleterious affect on plastic articles. It would also be desirable to have products produced from plastic materials which are designed to be used out of doors and which have a surface having improved resistance to ultraviolet radiation.

SUMMARY OF THE INVENTION

It is an object of the present invention to provide a method for the treatment of plastic surfaces to clean and restore the surface and to render the surface more resistant to ultraviolet radiation.

Another object of the invention is to provide a product having a plastic surface which has enhanced resistance to weathering, particularly to the effects of sunlight.

These and other objects and features are achieved by the present invention comprising a method for restoring weathered plastic surfaces and for enhancing the resistance of the treated surface to sunlight. In accordance with the invention, the surface of a plastic article being treated is first cleaned with a suitable cleaning agent and the surface is polished with a mild abrasive to remove major imperfections in the surface. Any of the commonly used detergent and polishing compounds for plastics may be utilized for this procedure and in addition it is preferred after cleaning and polishing to contact the surface with a mild etching solution to provide improved adhesion between the coatings and the plastic substrate. However, when treating transparent surfaces, the etching step may be eliminated.

Following cleaning and polishing, a first layer of an uncured adhesive material is applied over the surface. The adhesive material is selected from those compositions that are ultraviolet curable. Such compositions include unsaturated monomers which, when subjected to UV radiation, form free radicals to initiate polymerization. UV curable compositions useful in the present method also include compositions having a photo initiated catalyst which initiates polymerization upon exposure to UV radiation.

The first layer of UV curable material is left in its uncured condition and an overcoat of a curable adhesive is applied and cured to form a semi-permanent outer surface on the article. The article then can be exposed to sunlight and other effects of weathering and over a period of time the underlying ultraviolet curable coating is gradually cured by exposure to sunlight so that the coating over the surface of the article becomes even tougher and better cured the more the article is exposed to sunlight.

The method of the present invention is particularly useful for field operations where curing equipment is not readily available. For this reason it is highly preferred that the outer layer of curable adhesive material be of the solvent type which is air-curable without the necessity of external heat or photo-energy. The method of the present invention is particularly useful for the field refinishing of signs, outdoor furniture and the like.

Products prepared in accordance with the present invention have a UV resistant surface which, as described above, comprises a plastic substrate, an uncured UV curable first layer and an outer cured layer of adhesive compatible with the first layer. The surface of the product is more resistant to UV radiation in that the exposure, rather than having an adverse affect, actually improves the surface by curing the UV curable first coating so that over a period of time after exposure to sunlight the first layer of UV curable material continues to protect the underlying plastic surface even when the outer cured adhesive layer has been deteriorated by the weathering affect of the sunlight.

Other features and advantages of the invention will become apparent from the following detailed description.

DETAILED DESCRIPTION OF THE INVENTION

In accordance with the present invention plastic surfaces which over a period of time have become discolored, dull and oxidized due to exposure to the elements and which have been worn or scratched from wear or vandalism, can be restored and provided with an improve coating of UV resistant material. The method of the present invention is particularly useful for restoring the appearance of signs, emergency vehicle lights, bus windows, windows on vending machines, windows in telephone booths, skylights and the like which are exposed to heavy weathering and generally large amount of radiation due to exposure to sunlight. As used herein, the term "plastic" is defined as that group of natural or synthetic materials which may be shaped when soft and then hardened. The type of plastic material which can be treated in accordance with the present invention is not critical and may include such polymeric materials as polycarbonate, acrylic, ABS, butyrate, diallyl, nylon, polyethylene, poly-styrene, styrene, vinyl styrene copolymers and the like. The method of the present invention is particularly useful for field work in that no special curing or application equipment is required to restore the surfaces of the plastic articles. The method is simple to carry out and can be done by persons with relatively little training.

In restoring the surface of the plastic article in accordance with the present invention, the surface is first cleaned with a mild detergent or soap solution to remove any dirt which may have accumulated on the surface of the article. The particular soap or detergent is not critical and is selected as a matter of choice depending upon the environment in which the surface has been maintained and the nature of the dirt which is to be removed.

The surface being treated is preferably polished with a mild abrasive to remove surface scratches and other imperfections and dirt which is not removed by the soap or detergent solution. Good results have been achieved by sanding the surface with a fine grit wet/dry sandpaper, preferably 220 to 600 grit. In the alternative mild abrasive can be included in the soap solution so that the cleaning and polishing step occurs simultaneously. The abrasive material is not critical although, as discussed before, it is preferred to utilize between a 220 and 600 grit abrasive particle. Since the plastic articles are relatively soft almost any of the commonly used abrasive can be utilized in the method of the present invention including abrasive such as alumina, silica, silicon carbide, rouge (iron oxide) and the like.

The cleaned and polished surface of the plastic article is wiped dry and a first layer of an ultraviolet (UV) curable adhesive material is applied over the surface. The first layer may be applied by roller coating, a use of a doctor blade, brushing or the like. Good results have been obtained when the first layer is applied by spraying. The thickness of the layer is not critical although it is preferred that the layer of UV curable material applied over the cleaned and polished plastic surface have a thickness of between about 0.001 in and 0.010 in.

In a preferred embodiment, a sprayable mixture of a UV curable adhesive is prepared in a suitable solvent such as butyl alcohol, propyl alcohol, isopropyl alcohol or methyl ethyl ketone. The UV curable adhesive may comprise any material which is capable of free radical cross-linking or block polymerization initiated by UV radiation. Thus, for example, the UV curable material may comprise any of the polymerizable materials such as resins selected from the group consisting of styrene, vinyl and vinyl chloride, acrylic, silicone, polyester, polypropylene, polycarbonate, polyformaldehyde and the like which contain photosensitive groups incorporated into the polymer for subsequent block and graft synthesis. Such groups include carbon-chlorine, hydroperoxy, amino, keto and thio-keto linkages which are known to be photosensitive at UV wave lengths, particularly wave lengths ranging from between about 280 to about 400 Angstrom units. In addition the UV curable compositions useful in the present invention may include compositions comprising resins which are not necessarily photo-curable but which are combined with a photo sensitive catalyst which is activated by UV radiation to form a radical that will provide a site on a monomer or polymer to cause such monomer or polymer to polymerize or cross-link.

Preferably the UV curable composition is an acrylate which is preferred because of the known property of acrylic polymers to resist weathering. Thus as the UV curable acrylic composition is exposed to UV radiation from sunlight and the like, the composition cures into an acrylic coating which is highly weather-resistant. Good results have been achieved using an unsaturated acrylate which is solubilized in butyl alcohol to form a sprayable mixture. This material is sold under the designation UVT 152 by the Redspot Company. A similar UV curable polycarbonate material also provides good results and this material is distributed under the designation UVT 200 by the Redspot company.

After the first layer of UV curable material has been applied, an outer coat of curable material is applied over the uncured UV curable material. The outer coat comprises material that preferably is air-curable for relatively rapid setup to form an outer protective coating of cured polymer over the uncured UV curable material. The outer coating is selected from a curable material which is compatible with the uncured UV curable material and is bonded to the plastic substrate by the uncured UV curable material so as to provide a cured outer coat over the surface of the plastic article for immediate protection of the surface and the UV curable material. The outer coat may be selected from any of polymeric materials such as a polyurethane/acrylic solution polymers, allyl resins, urea and urea/melamine resins, cellulose esters, epoxy resins, linear epoxies which cure by solvent evaporation, silicone resins and the like. A preferred composition for the outer coat is the acrylic solution polymer as it is compatible with the preferred acrylic UV curable material and also is highly resistant to weathering itself. The outer coating is applied by spraying since this has the least adverse affect on the already applied layer of uncured UV curable material.

The following example illustrates the manner of treatment of a plastic surface to apply a weather-resistant material to restore the protective coating thereover.

EXAMPLE

An acrylic sign and a polycarbonate sign were selected for refinishing according to the invention. Both signs had been exposed to the elements and a substantial amount of UV radiation in southern California and both had surfaces that were discolored and showed evidence of peeling. Both of the signs were treated in the following manner:

The surfaces of the signs were first cleaned with a cleaner (AJAX" cleanser) and then scoured with 400 grit abrasive powder. The surfaces were then washed with water to remove detritus, cleaning agent and abrasive.

The surfaces were sprayed with an ultra violet curable material identified as UVT 152 to achieve a uniform coating of the material over the surface. The uniformity of the coating is checked by observing the reflectance from a beam of a flash light.

An outer, curable coating consisting of solubilized urethane/acrylic copolymer was applied by spraying the copolymer over the uncured ultra violet curable coating. After standing for 15 minutes the outer coating had cured sufficiently to permit the panals to be tested for wetherability. The panals were subjected to an accelerated WEATHEROMETER ® test for an equivalent of about two years exposure to sunlight. The accelerated test involved exposing to alternating 30 minute cycles of uv radiation, reduced temperature of $-20°$ C., elevated temperature of $120°$ C. and water spray at room temperature. The accelerated test was conducted for 45 days which is the equivalent of approximately 2 years of normal weather conditions. Upon completion of the accelerated weathering test the panels showed no evidence of surface peeling or discoloration normally encountered with weathered plastic surfaces.

As will be understood by those skilled by those in the art various arrangements other than those described in detail in the specification will occur to those persons, which arrangements lie within the spirit and scope of the invention. It is therefore to be understood that the invention is to be limited only by the claims appended hereto.

Having described the invention, I claim:

1. A method for treating weathered plastic surfaces of an article to enhance the resistance of said treated surface to weathering due primarily to the harmful effects of ultra violet radiation, said method comprising the steps of:
   a. cleaning said surface with a cleaning agent;
   b. polishing said surface with a abrasive to remove major imperfections in the surface;
   c. applying a layer of an uncured UV curable material over said cleaned and polished surface, said first layer defining an adhesive layer;
   d. applying a coat of a curable material over said UV curable adhesive layer to form a protective coating over said uncured layer, said curable material being compatible with said adhesive layer and held thereby on said plastic surface;
   whereby as said treated surface is exposed to ultra violet radiation curing of said layer is initiated.

2. The method of claim 1 wherein said UV curable material is selected from the group of polymerizable materials consisting of styrene, vinyl and vinyl chloride, acrylic, silicone, polyester, polypropylene, polycarbonate, polyformaldehyde and combinations thereof which contain photosensitive groups for subsequent block and graft synthesis upon exposure to ultra violet radiation.

3. The method of claim 2 wherein said photosensitive groups are selected from the group consisting of carbon-chlorine, hydroperoxy, amino, keto and thio-keto groups and combinations thereof.

4. The method of claim 3 wherein said photosensitive groups are activated by radiation at wavelength between about 280 and about 400 Angstrom units.

5. The method of claim 1 wherein said UV curable material is selected from the group of polymerizable materials consisting of styrene, vinyl and vinyl chloride, acrylic, silicone, polyester, polypropylene, polycarbonate, polyformaldehyde and combinations thereof and an effective amount of a photosensitive catalyst for activation upon exposure to ultra violet radiation.

6. The method of claim 1 wherein said first layer of UV curable material is applied to said surface by spraying.

7. The method of claim wherein said coat of curable material is selected from the group consisting of polyurethane/acrylic solution polymers, allyl resins, urea and urea/melamine resins, cellulose esters, epoxy resins, linear epoxies and combinations thereof.

* * * * *